Figure 1:
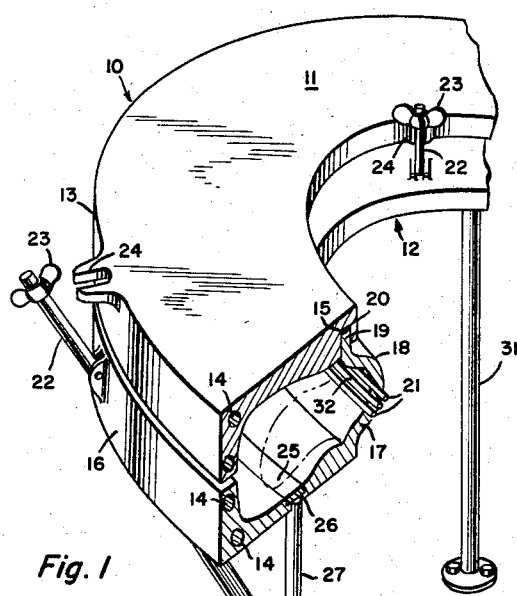

Feb. 3, 1959   O. S. WHITE   2,871,514
EQUIPMENT USED TO VULCANIZE OR RECAP VEHICLE TIRES
Filed April 4, 1955   3 Sheets-Sheet 1

INVENTOR
Ottis S. White
BY
ATTORNEY

Feb. 3, 1959                    O. S. WHITE                  2,871,514

EQUIPMENT USED TO VULCANIZE OR RECAP VEHICLE TIRES

Filed April 4, 1955                            3 Sheets-Sheet 2

INVENTOR
Ottis S. White

BY A. Yates Dowell

ATTORNEY

INVENTOR
Ottis S. White

BY A. Yates Dowell

ATTORNEY

United States Patent Office 2,871,514
Patented Feb. 3, 1959

2,871,514

EQUIPMENT USED TO VULCANIZE OR RECAP VEHICLE TIRES

Ottis S. White, Florence, Ala.

Application April 4, 1955, Serial No. 498,956

8 Claims. (Cl. 18—18)

This invention relates to rubber and other substances of a generally similar nature and to articles manufactured therefrom including pnuematic tires employed on automobiles and other vehicles and to the recapping, retreading or repair of such tires by the application of heat and pressure.

The invention relates particularly to the treatment of pneumatic tires of the so-called tubeless variety in which the rim forms part of the structure in which the air is retained, and in which the amount of rubber is considerably less than in pneumatic tires of the character in which the tube is employed within the outer casing.

The invention is concerned with equipment employed in the vulcanization of pneumatic tires including the molds employed, the manner of externally and internally supporting the tires during vulcanization, and with means for selectively applying heat to the proper areas to be vulcanized without the supplying of excessive heat causing damage to other portions of the tires.

Heretofore, equipment employed in recapping, retreading and repairing pneumatic tires has been subject to criticism on account of the amount of time required to perform the necessary operations as well as the difficulty in applying heat in the desired locations and the large amount of equipment required. Also, it has been necessary to employ air or sand bags within the tires to prevent collapsing of the latter and such bags have required replacement.

It is an object of the invention to overcome the disadvantages above enumerated and to provide relatively simple vulcanizing equipment for use on motor vehicle tires of all kinds including both light and heavy duty, and of the character employed with or without inner tubes, as well as equipment in which heat can be selectively applied over any desired inner or outer surface area without the application of excess heat to other areas or without the use of filler members or air or sand bags on the interior of the tire.

Another object of the invention is to provide equipment of the above character by means of which considerably less time is required in performing the necessary vulcanizing operations, by which a conventional mold may be employed, and by which a single mold may be used for tires of different sizes.

Another object of the invention is to provide selective and independent means for applying heat in a number of different ways, and to provide means for draining away moisture, condensed or otherwise, present in the tire.

Figure 2:
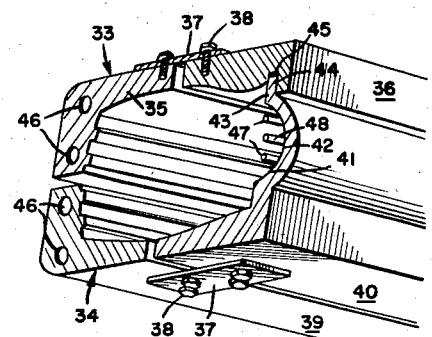
Figure 3:
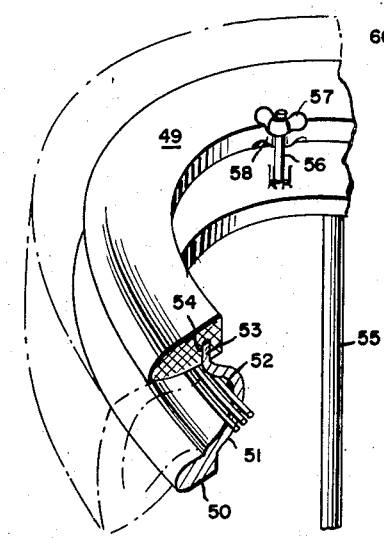
Figure 4:
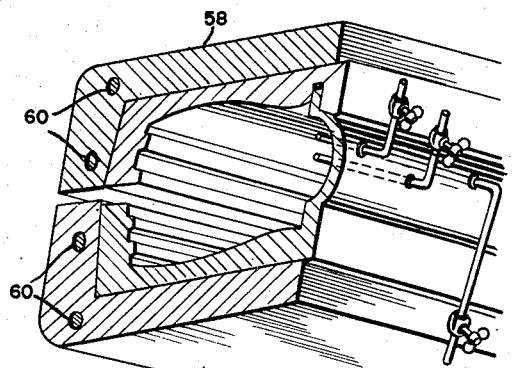
Figure 5:
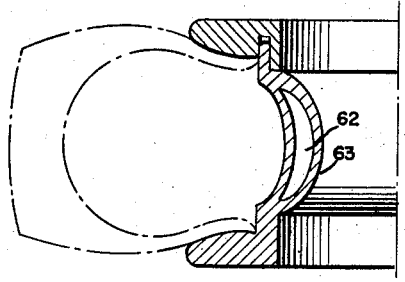
Figure 6:
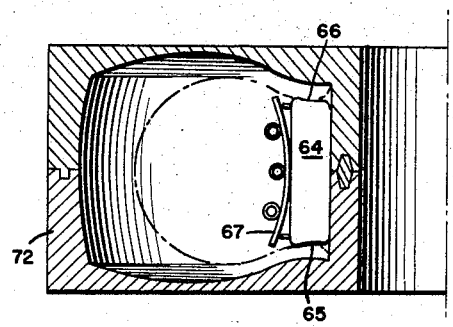
Figure 7:
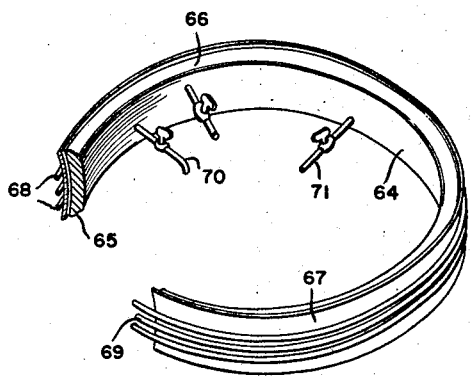
Figure 8:
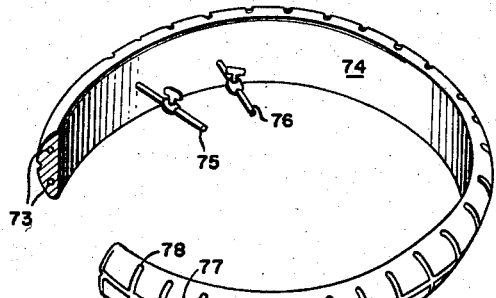
Figure 9:
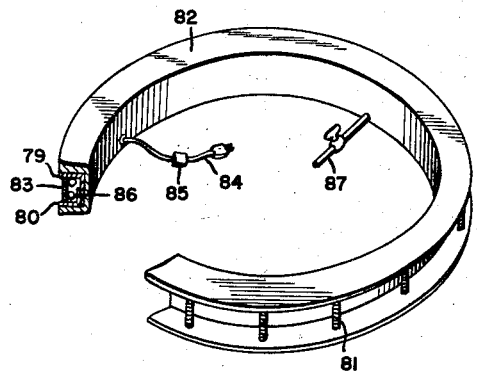
Figure 10:
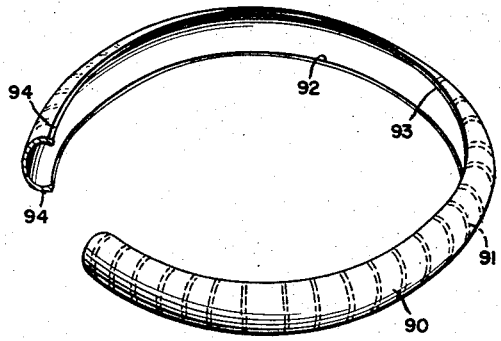
Figure 11:
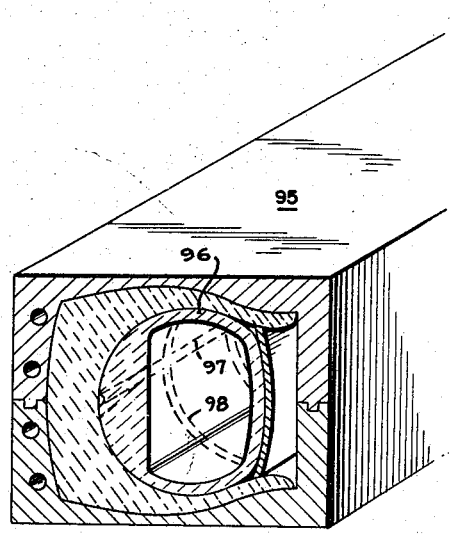
Figure 12:
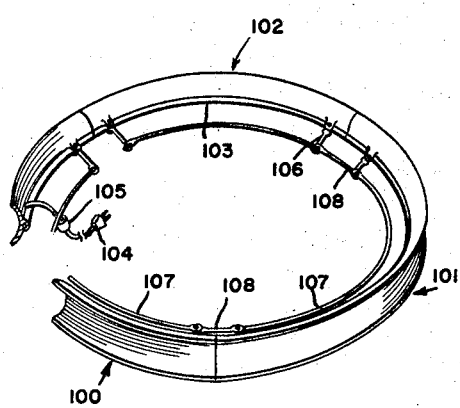
Figure 13:
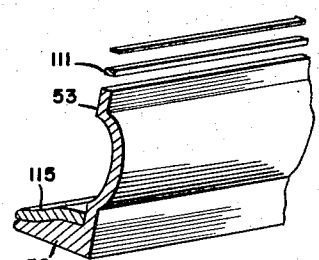
Figure 14:
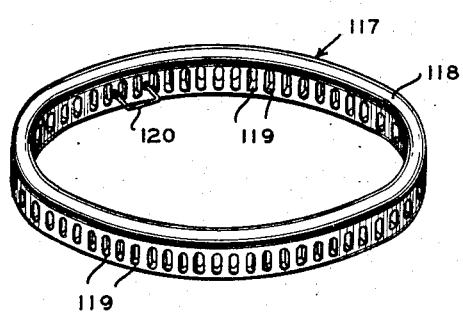
Figure 15:
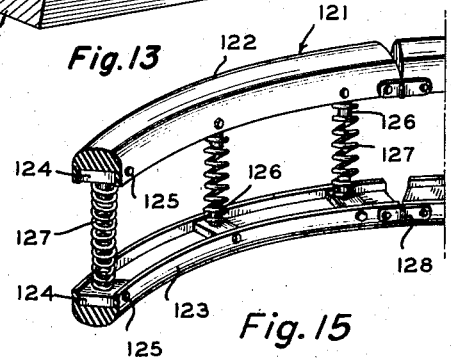

Further objects and advantages of the invention will be apparent from the following description taken in conjunction with the accompanying drawings, wherein:

Fig. 1 is a fragmentary perspective illustrating one application of the tire recapping mold;

Fig. 2, a fragmentary perspective illustrating a modified tire recapping mold;

Fig. 3, a fragmentary perspective illustrating a further modification of the tire recapping mold;

Fig. 4, a fragmentary perspective illustrating another modification of the tire recapping mold;

Fig. 5, a section of a modification of a mold similar to that shown in Fig. 3;

Fig. 6, a cross section of a mold using the tire bead expander ring shown in Fig. 7;

Fig. 7, a perspective of such ring;

Fig. 8, a perspective view having cut-away portions illustrating a heating pad for use within a recapped tire;

Fig. 9, a perspective with cut-away portions illustrating still another form of applicant's tire expander ring;

Fig. 10, a perspective with cut-away portions illustrating still another modification of a tire expander ring;

Fig. 11, a fragmentary perspective illustrating the use of an air bag in accordance with applicant's invention;

Fig. 12, a perspective with cut-away portions illustrating a separable heating element for use within heavy tires;

Fig. 13, a fragmentary perspective illustrating the use of spacer and filler rings for adjusting the molds to tires of different sizes;

Fig. 14, a perspective view of an annular member for use within a tire casing to prevent collapse of the side walls; and Fig. 15, a fragmentary perspective view of a modified annular member used for the same purpose as that shown in Fig. 14.

Briefly stated, the equipment of the present invention includes a mold of two parts which can be readily separated for applying and removing a tire and which can be heated by steam, by electrical heating means or in any other desired manner, and with the mold so constructed that the heat may be selectively applied to the side wall, or tread either on the exterior or interior of the tire, and any moisture within the tire can be readily drained. A tight fit is provided between the mold sections and the tire so that air may be confined within the chamber thus formed.

Referring to the drawings, the invention comprises a tire recapping mold 10 as disclosed in Fig. 1 having an upper portion 11 and a lower portion 12. The upper portion consists of an annular body having an inwardly directed flange portion 13 along its outer periphery which carries tread molding portions on its inner surface. A groove 15 is provided along the inner periphery of upper mold portion 11. The lower mold portion 12 has an inwardly directed flange 16 around its outer periphery which carries tread molding surfaces along its inner side. Steam passages or galleries 14 are provided in both the upper flange 13 and the lower flange 16 for applying heat to the outside of a tire for curing. The lower mold portion 12 further comprises an upwardly directed flange 17 having a concave surface 18 around its inner side and a tongue portion 19 around its upper extremity which fits into groove 15 of the upper mold portion 11. A gasket 20 in groove 15 cooperates with tongue 19 to form an airtight joint between the upper and lower mold portions. Steam pipes 21 are supported around the inner side of flange 17 in front of the concave surface 18 which serves as a heat reflector to direct radiated heat toward the inner portion of the tread area of a tire. Steam pipes 21 are connected to a steam line at one end and to a condensate drain at the other end and including conventional valving.

Pivoted bolts 22 are attached to the lower mold portion 12 along the inner and outer flanges. These bolts 22 carry wing nuts 23 for fastening the two mold portions together when the pivoted bolts 22 are positioned between ears 24 attached to both the inner and outer flanges of the upper mold portion 11.

The tire ejector mechanism illustrated in Fig. 1 comprises an annular ring 25 placed in an annular slot 26 in the lower mold portion 12 and connected to rod 27 which in turn is attached to a piston contained in cylinder 28 operated by air pressure from line 29 and controlled by valve 30. The lower mold portion is supported at a working height on standards 31.

A perforated pipe 32 is supported around the inner side of flange portion 17 and connected to an air pressure source. Pipe 32 is used for pneumatically inflating the tire in the mold. The beads of the tire form an airtight joint between both mold portions to hold the air pressure in the mold. Therefore, the walls of the tire are forced against the inner surfaces of the recapping mold and no air bag, heretofore used, is necessary during a recapping operation.

In the recapping process of a tire, the old tread is removed by buffing, after which cement is applied to the tire carcass and new rubber in the form of a strip is applied to the tire. The tire is then placed in a mold for curing and vulcanizing.

The curing temperature is approximately 281 degrees for the rubber to vulcanize to the tire carcass and cure. The new rubber should be brought up to temperature in approximately seven minutes. If the heat is brought up much slower, it has been found that the rubber will semi-cure and be useless.

As it has been found that the temperature must be raised quickly in the process, applicant has devised a method of heating both the inside walls and the outside walls of a tire during the recapping process. It has been found that by applying heat at 281 degrees or less to the inside walls of a tire at the same time heat is being applied to the outside, the curing time for a recapped tire has been reduced to one-third the time ordinarily required.

A further advantage is that the rubber directly in contact with the mold will not over cure. This means that the first 2/32 inch of the tread will give more mileage.

The recapping tire mold illustrated in Fig. 2 is similar to the mold of Fig. 1 with the exception that both the upper mold portion 33 and the lower mold portion 34 are made in two parts. The upper mold portion 33 comprises an annular tread part 35 and an annular inner part 36 connected to tread part 35 by straps 37 and bolts 38. The lower mold portion 34 consists of outer tread parts 39 and inner parts 40 connected together by straps 37 and bolts 38.

The inner part 40 further carries an upwardly directed flange 41 having a concave inner reflecting surface 42 and a tongue 43 at its upward extremity which fits into slot 44 provided in the inner portion 36 of the upper portion 33 of the recapping mold. Gasket 45 is positioned in slot 44 to cooperate with tongue 43 in forming an airtight junction. Steam passages or galleries 46 are provided in the outer tread parts of both the upper and lower portions of the mold. Steam pipes 47 are supported around the inner side of flange 41 in front of reflecting surface 42 for heating purposes.

A perforated pipe 48 is further supported around the inner surface of flange 41 and connected to an air pressure source for use in pneumatically inflating the tire during the recapping operation.

The advantage of the mold shown in Fig. 2 is that the side walls of a recapped tire are not unduly heated in the area of the bead portion of the tire during a recapping operation because only a small amount of heat can be conducted from the outer tread parts of the mold to the inner parts of the mold due to their separation from each other by the straps 37.

The mold illustrated in Fig. 3 is designed to be used with conventional recapping molds which cover only the tread in operation today in recapping plants for applying heat to the inside of a tire. This mold has no tread portions and comprises an upper annular ring 49 and a lower annular ring 50 having an upwardly directed flange 51 around its inner periphery. Flange 51 has an inner concave surface 52 used to reflect radiated heat toward the tread area of the tire. Flange 51 further carries tongue 53 which fits in a slot 54 carried in upper ring portion 49. Tongue 53 cooperates with a gasket in slot 54 for creating an airtight joint between the two mold portions.

The lower mold portion is supported on standards 55 at a convenient height for workmen above the floor. The two mold portions are connected together by pivoted bolts 56 which carry wing nuts 57, bolts 56 being pivotally attached to the lower mold portion 50 and cooperating with ears 58 to hold the two mold portions together.

The mold illustrated in Fig. 4 is similar to Fig. 1 with the exception that the mold portion is separable from the heating portions, this mold comprising upper and lower portions similar to the mold in Fig. 1 supported between an upper heater 58 and a lower heater 59. Steam passages or galleries 60 are provided in both the upper and lower heaters. This construction is used when it is desirable to center the tread portion of a recapped tire in relation to the bead portion of a recapped tire.

A modified mold illustrated in Fig. 5, is similar to the partial mold of Fig. 3 with the exception that the steam gallery 62 is made integrally with the inner flange 63 of the lower portion of the mold.

A bead sealing ring is illustrated in Figs. 6 and 7. This ring is designed for use with a conventional tire recapping mold, the bead sealing ring comprising body 64 having a lower bead engaging edge 65 and an upper bead engaging edge 66. A concave reflecting surface 67 is attached around the outer side of ring 64 for reflecting radiated heat toward the tread area of the inside of a tire. Steam pipes 68 are supported around the outside of reflecting plates 67 and attached at one end to steam supply 70 and at the other end to condensate drain 71. A perforated air supply pipe 69 is further supported around the outside of plate 67 for pneumatically inflating the recapped tire within the mold. Tire bead sealer ring 64 is placed inside of a tire prior to the time the tire is positioned inside of conventional mold 72 shown in Fig. 6. The surfaces 65 and 66 of ring 64 form an airtight joint between the bead of a recapped tire. The tire is then inflated, the side walls of the tire being forced outwardly against the tire molds inner surfaces for curing.

A heating pad is illustrated in Fig. 8 for positioning inside a recapped tire for applying heat to the tread area of the recapped tire. The body 74 of the pad carries steam galleries 73 connected to steam supply 75 and condensate drain 76. Further, the outer side of pad body 74 is provided with a longitudinal drain channel 77 and a plurality of lateral drain channels 78 which communicate with channel 77 for draining off any steam or water that might be trapped between the pad and the inner walls of the tire. This prevents "moisture blowouts" which are a failure of recapped tires caused by a separation between the plies of the tire at the time of the recapping. This separation is caused by moisture trapped in a tire turning to steam during the recapping operation.

A modified bead sealer ring is illustrated in Fig. 9. This modified ring is useful for heavy truck tires which have tough and strong beads. This bead sealer ring is used in the same way that the bead sealer ring is used in Fig. 6. This bead sealer ring comprises two annular angle members 79 and 80 with inwardly directed telescoping flanges. Coil springs 81 are used to force the two annular rings apart. An annular channel member formed from rubber material 82 is placed over the two telescoping ring members 79 and 80. Electric heating element 83 is used for heating purposes and is connected to a source of electricity through cord 84 and controlled by a conventional thermostat 85. A perforated air pipe 86 is supported around the inner walls of the bead sealer ring and connected to an air supply 87 for inflation purposes when the ring is placed inside a recapped tire.

A reinforced rubber insert is illustrated in Fig. 10 for use in recapping with the applicant's molds for prevention of air leakage through nail holes in the tire during the curing process. This insert consists of a rubber body 90 having spring steel reinforcing inserts 91 embedded therein for forcing the sides of the insert outwardly. The inner edges of the insert terminate in lips 92 and 93 which are pressed outwardly against the tire when inflated in the mold for sealing off air leakage between the insert in the tire. Beads 94 are also provided adjacent lips 92 and 93 for aiding in sealing off air leakage between the insert and the tire.

Fig. 11 illustrates a modified air bag for use in recapping tires using conventional molds such as 95. The applicant's air bag 96 has a longitudinal channel 97 and cross channels 98 communicating with longitudinal channel 97 for drainage of any water or steam that might be trapped between the tire and the air bag to prevent moisture blowouts as previously explained in connection with Fig. 8.

A separable heating unit for use in large or heavy tires is illustrated in Fig. 12. This heating unit comprises three body members 100, 101 and 102, which when assembled together form an annular ring. Heating elements 103 are provided in the central portions of the body members 100, 101 and 102. These heating elements make connection with each other through socket connections consisting of female and male members. A conventional outlet cord 104 is attached to the heating element 103 for connection with an electrical energy source. This outlet cord further carries thermostat 105 for automatically controlling the temperature of the heating element.

Legs 106 are pivotally attached at each of the ends of the three sections. Rigid rod members 107 and 108 are pivotally connected between leg members 106. Leg members 106 serve to hold the heating units centrally inside of a tire, the rods 107 and 108 serving to fold or unfold the legs 106 at the same time and to hold them in open position. This separate heating unit is used in large tires when the tire beads are forced together when put in a mold. This keeps the heating units of the molds, for example, the mold shown in Fig. 1, from being effective to transmit the heat towards the inside of the tire. Therefore, heating units shown in Fig. 12 are useful in such instances to heat the inside of such heavy tires.

Fig. 13 illustrates the use of filler rings such as ring 115 to position the lower portion of the mold shown in Fig. 3 to fill up space between tires and beads that do not seat properly against the mold portions.

Fig. 13 further illustrates the use of a spacer ring 111 positioned between tongue 53 and the gasket in the slot 54 for adjusting the width of the mold for different size tires. A plurality of rings 111 can be used to give a number of different size molds.

With reference to Fig. 14, an annular member 117 is shown which is made of reasonably hard rubber and is used inside a tire casing for abutting the side walls substantially along a line where a "full cap" terminates. Annular member 117 has upper and lower edges 118 and openings 119 for allowing pressure and heat to reach the inside walls of the position of the casing that is being recapped.

The edges 118 abut the inner walls of the casing when clamped within a mold and aid in the outer walls of the casing adjacent the annular member forming an air tight seal with the mold surfaces. This aids in holding the air pressures within the tire casing even though the tire beads are not firmly seated in the mold.

A handle 120 is provided for aid during the insertion or removal of the annular member from a tire casing.

With reference to Fig. 15, a modified annular member 121 is illustrated which is used in a manner identical to the annular member 117 of Fig. 14. The annular member 121 comprises two opposed channel members 122 and 123 having outer surfaces adapted to abut the inner side walls of a tire casing and having inner channels. Blocks 124 are attached in position in the channel members 122 and 123 by bolts 125. Projections 126 are provided on the blocks 124 for positioning compression springs 127 between opposed blocks 124.

The annular member 121 is designed to be divided into at least five sections which are connected together by the hinges 128. These hinges 128 adapt the member 121 for folding to enable insertion within a tire casing. Each section is made a little longer than the preceding section.

It will be obvious to those skilled in the art that various changes may be made in the invention without departing from the spirit and scope thereof and therefore the invention is not limited by that which is shown in the drawings and described in the specification but only as indicated in the accompanying claims.

What is claimed is:

1. A tire recapping mold comprising an upper mold portion and a lower mold portion, said lower mold portion being an annular ring having a tread molding surface along its outer periphery and an upturned flange along its inner periphery, said upturned flange having a curved portion constituting a heat reflector for radiating heat toward the inside of the tire, said flange also having heating means supported along its inner side adjacent to said curved portion, an air inlet pipe connected to said flange, said upper mold portion being an annular ring having a tread molding surface around its outer periphery for cooperation with the tread molding surface on the lower mold portion, said upper mold portion further having a groove along its lower side adjacent its inner periphery for cooperation with the upturned flange of said lower mold portion in forming an air tight mold, a gasket in said groove, clamp bolts pivotally mounted on said lower mold portion for cooperation with ears attached to said upper mold portion to hold the two mold portions together, standards attached to the lower mold portion for supporting the tire mold from the floor, said lower mold portion further containing an annular band recessed in an annular slot in the upper side of said lower mold portion, said band being connected to pneumatic means for forcing the finished tire from the mold at the end of the capping operation.

2. A tire recapping mold comprising an upper mold portion and a lower mold portion, said lower mold portion being an annular ring having a tread molding surface along its outer periphery and an upturned flange along its inner periphery, said upturned flange having a curved portion constituting a heat reflector for radiating heat toward the inside of the tire, said flange further having heating means supported along its inner side adjacent to said curved portion, and an air inlet pipe connected to said flange, said upper mold portion being an annular ring having a tread molding surface around its outer periphery for cooperation with the tread molding surface on the lower mold portion, said upper mold portion further having a groove along its lower side adjacent its inner periphery for cooperation with said upturned flange of said lower mold portion in forming an air tight mold, clamp bolts pivotally mounted on said lower mold portion for cooperation with ears attached to said upper mold portion to hold the two mold portions together, standards attached to the lower mold portion for supporting the tire mold from the floor.

3. A tire recapping mold comprising an upper mold portion and a lower mold portion, said lower mold portion being an annular ring having an upturned flange along its inner periphery, said upturned flange having a curved portion constituting a heat reflector for radiating heat toward the inside of the tire, said flange further having heating means supported along its inner side in front of said curved portion, and an air inlet pipe connected to said flange, having a groove along its lower side adjacent its inner periphery for cooperation with said upturned flange of said lower mold portion in forming an air tight mold, and clamp bolts pivotally mounted on said lower mold portion for cooperation with ears attached to said upper mold portion to hold the two mold portions together.

4. A tire recapping mold comprising an upper mold portion and a lower mold portion, said lower mold portion being an annular ring having bead engaging means and an upturned flange along its inner periphery, said upturned flange having a curved portion constituting a heat reflector for radiating heat toward the inside of the tire, said flange further having heating means associated with said curved portion, and an air inlet pipe connected to said flange, said upper mold portion being an annular ring having bead engaging means and having a groove along its lower side adjacent its inner periphery for cooperation with said upturned flange of said lower mold portion in forming an air tight mold, and clamping means to hold the two mold portions together.

5. A tire recapping mold comprising an upper mold portion and a lower mold portion, said lower mold portion being an annular ring having a tread molding element connected along its outer periphery by straps and an integral upturned flange along its inner periphery, said upturned flange having a curved portion constituting a heat reflector for radiating heat toward the inside of the tire, said flange further having heating means along its inner side in front of said curved portion, and an air inlet pipe connected to said flange, said upper mold portion being an annular ring having a tread molding element connected around its outer periphery by straps for cooperation with the tread molding element on the lower mold portion, said upper mold portion further having a groove along its lower side adjacent its inner periphery for cooperation with said upturned flange of said lower mold portion in forming an air tight mold, and clamping means to hold the two mold portions together.

6. A tire recapping mold comprising an upper mold portion and a lower mold portion, said lower mold portion being an annular ring having an upturned flange along its inner periphery, said upturned flange having a curved portion constituting a heat reflector for radiating heat toward the inside of the tire, said flange further having heating means contained therein for inside heat of the tire, said upper mold portion being an annular ring and having a groove along its lower side adjacent its inner periphery for cooperation with said upturned flange of said lower mold portion in forming an air tight mold.

7. Apparatus for recapping tubeless tires comprising a tread mold for receiving the tread portion of the tire and the camel back, an inner periphery tire bead engaging sealing means coextensive with the bead portions for closing the inner periphery of the tubeless tire in air sealing contact, radiant heating means supported from said inner periphery tire bead engaging sealing means for location between the side walls of the tire, reflecting means for said radiant heating means radially inwardly of said radiant heating means for directing the radiant heat from said radiant heating means to the inside surface portion of the tire adjacent and immediately inwardly of the tread portion of the tire, means for conducting inflating fluid through said sealing means into the interior of the tire for inflating the tire against the periphery and the sides of the tread mold, and means for conducting heating energy through the sealing means for producing radiant heat in said radiant heating means.

8. The invention according to claim 7 in which the tread mold is provided with additional heating means for applying heat to the outer portion of the tread.

References Cited in the file of this patent

UNITED STATES PATENTS

| | | |
|---|---|---|
| 1,162,397 | Price | Nov. 30, 1915 |
| 1,390,005 | Young | Sept. 6, 1921 |
| 1,910,128 | Semler | May 23, 1933 |
| 2,003,567 | Woock | June 4, 1935 |
| 2,324,644 | Powell et al. | July 20, 1943 |
| 2,474,517 | Daum et al. | June 28, 1949 |
| 2,479,493 | Horton-Wellings | Aug. 16, 1949 |
| 2,561,573 | Hovlid et al. | July 24, 1951 |
| 2,565,063 | Briscoe et al. | Aug. 21, 1951 |
| 2,645,265 | O'Neil | July 14, 1953 |
| 2,697,252 | Clark | Dec. 21, 1954 |